United States Patent Office 3,695,896
Patented Oct. 3, 1972

3,695,896
PRESERVATION OF VOLATILE FOODSTUFF
FLAVOURS
Hiroshi Sugisawa, Summerland, British Columbia, Canada, assignor to Canadian Patents and Development Limited, Ottawa, Ontario, Canada
No Drawing. Filed Jan. 21, 1970, Ser. No. 4,776
Int. Cl. A23l 1/22
U.S. Cl. 99—140 R       38 Claims

ABSTRACT OF THE DISCLOSURE

The invention is concerned with the preservation of volatile flavours and aromas in a stable, dry form. A sugars-containing mixture comprising at least 50% sucrose is heated to a temperature and for a period of time sufficient to cause formation of oligo-saccharide sugar polymers. The resultant base is cooled, and the desired flavour and aroma essences together with a binding agent are blended therewith. The final product having the flavour and aroma essences entrapped with the sugar polymers is dried to give a stable, dry food product.

---

The present invention relates to the preservation of volatile foodstuff flavours in stable, dry powdered form.

The preparation of dried foodstuffs having low moisture content but retaining attractive flavour and aroma is a continuing problem in the food industry. The process of drying the foodstuffs almost invariably causes loss of most of the volatile flavour components, particularly where an elevated temperature is utilized. It is common practice to capture volatile flavour components released during the drying process, and to concentrate their aroma and flavour-bearing components at least 100 fold to produce an essence. The flavour essence can then be returned to the foodstuff after it has been dried, but in most cases the addition of sufficient essence to impart full flavour to the foodstuff will increase the moisture content of the dried foodstuff beyond an acceptable level, resulting in deterioration of the dried foodstuff and removal of its free-flowing properties.

In U.S. Pat. 2,906,630, dated Sept. 29, 1959, Turkot et al. disclose a process of concentrating the food flavour aqueous essence to at least 200 fold strength and returning the flavour essence to the dried foodstuff while it is in a molten state and under super atmospheric pressure, and subsequently cooling the product to form a brittle solid. It is also well known to concentrate volatile flavour and aroma components by extraction with low boiling point solvents and subsequent evaporation. The high strength flavour concentrates can be added to foodstuffs by direct spraying of the essence onto the foodstuff particles, or by mixing the essence with dry sugar and subsequently mixing the flavour-enriched sugar with the dried foodstuff to produce a sweetened, dried, food product ready for reconstitution.

It is also known to attempt to "lock-in" flavour components by emulsifying a non-aqueous essence extract with a molten sugar base (see, for example, U.S. Pat. 2,856,291, dated Oct. 14, 1958, Schultz). The mixture is cooled and ground for addition to the dried foodstuff powder. Other substances, such as gelatin, vegetable gums, and sorbitol have also been utilized in attempts to lock-in and preserve volatile flavour components.

Each of the above methods of capturing and preserving foodstuff flavour volatiles possess limitations and disadvantages which render them unsuitable for use in many instances. Solvent extraction of water-soluble food flavours often causes changes in the chemical composition of some of the components in the flavour volatiles and, in addition, can result in significant alteration in the ratio in which the various components are present due to differential extraction and thus alter the characteristic aroma and flavour of the essence. Also, the volatility and loss of the essence in the stored product remains as a significant disadvantage. Although flavour-locking techniques of the type described by Schultz in U.S. Pat. 2,856,291 have proved to be useful in the preservation of flavour components such as citrus oils and the methylanthranilate fraction of Concord grape essence, they permit significant loss of water-soluble flavour volatiles such as those found in apples, stone fruits, and berries.

It is apparent from the above that there is a need for a satisfactory method of retaining foodstuff volatiles in a low-moisture form such that losses due to their volatility are reduced to a minimum and storage for long periods of time is possible without significant deterioration.

It is a major object of this invention to fill this need and provide a method for preservation of volatile flavour and aroma essences of foodstuffs.

Another object of this invention is to provide a stable, dry powder containing volatile foodstuff flavours which can be mixed readily with foodstuffs such that, when moisture is added, the aroma and flavour of the foodsutff is substantially the same as that of the fresh foodstuff.

According to the practice of this invention, volatile flavour components of foodstuffs are locked into the complex stereostructure of oligo-saccharides. The term oligo-saccharides is used throughout this specification to refer to the sugar polymers consisting of from two to approximately twelve sugar molecules which result from the heating of sugars. Oligo-saccharides already may be present in certain sugar compounds and in the practice of this invention are additionally produced by the heating of sugar mixtures. Where utilized throughout this specification, percentages are by weight, unless otherwise indicate.

Briefly described, the method of this invention includes heating a sugars-containing mixture havign a sucrose content between about 50% and about 80%, by weight, to a temperature and for a period of time sufficient to cause formation of oligo-saccharides in such an amount as to ensure a resultant sugar polymers base. The sugar polymers base is diluted with water to bring the total sugars content to between about 70% and about 80%, by weight, and also is brought to a temperature less than approximately 50° C. The desired flavour and aroma essences are mixed with a binding agent, the binding agent being in an amount sufficient to constitute from about 1% to about 5% by weight, of the final product, and the mixture then blended with the sugar polymers base. The product then is dried at a temperature not exceeding about 50° C. to a moisture content of less than about 5%. Optionally, the product may be ground to give a powdered, amorphous product.

The product of this invention, briefly described, is a stable, dry food product having oligo-saccharide sugar polymers as a major constituent, with the volatile flavour and aroma essences of the food product being essentially entrapped in the complex stereostructure of the sugar polymers.

The required oligo-saccharides may be prepared from several different sugars and sugar-containing products such as sucrose, corn syrup, maltose, dextrose, malto-dextrin, dextrin, the hydrol byproduct of starch hydrolysate preparation, hydrogenated hydrol products, and mixtures thereof. Sucrose should comprise at least about 50% of the total sugars present, since it has been found that starting mixtures with less than approximately 50% sucrose content have considerable tackiness after the drying step and this can impede subsequent grinding. On the other hand, the sucrose concentration should not be much above 80% in the starting mixture since it also has been found that, upon cooling, sugar mixtures with a high sucrose content become glassy, difficult to grind, and do not as readily lock-in the flavour essences. The sucrose content preferably should be from about 50% to about 75% in the initial mixture so as to provide a resultant sugar polymer product in an amorphous form which is amenable to subsequent treatment.

Starch hydrolyzates such as corn syrup, malto-dextrin and dextrin may be utilized in the starting materials. These substances are commonly differentiated by reference to their dextrose equivalent (D.E.), which is a measure of the copper reducing power calculated as dextrose and expressed as a percentage of the dry substance, usually written as D.E. 25–45 or as 25%–45% dextrose equivalent. In the practice of this invention "low-dextrose" corn syrup (D.E. 25–45) can be used directly, or corn syrup having a D.E. of 45–70 can also be utilized if malto-dextrin or dextrin is also present. Malto-dextrin usually has a D.E. of 15 to 25, and dextrin a D.E. of 5–15. A lower value of the dextrose equivalent indicates a higher content of oligo-saccharides. Malto-dextrin comprises small amounts of dextrose and a large porportion of oligo-saccharides having alpha-1,4-linkages. The oligo-saccharides already present have the ability to trap flavour compounds within their complex stereostructure. Thus, the use of low-dextrose corn syrup and malto-dextrin (up to about 100% by weight of the corn syrup) in the starting mixture lessens the temperature and heating time required for the formation of the sugar polymers. Use of water-soluble malto-dextrin has also been found to reduce any tendency of the final product to cake.

Hydrol is a common technical term utilized to describe the supernatant liquid remaining after separation of dextrose crystal from starch hydrolyzates. Hydrol is a by-product from starch hydrolyzates and contains dextrose and alpha- and beta-linked oligo-saccharides. For economic reasons it may be preferable to utilize hydrol or hydrogenated hydrol products in the starting mixtures.

The oligo-saccharides utilized for the flavour-locking are prepared by heating a mixture of sucrose and other sugar-containing products from the above list to a temperature and for a period of time sufficient to cause formation of the necessary sugar-polymer stereostructures. This is preferably accomplished by adding a small amount of water to the mixture, bringing the mixture to a boil, increasing the temperature gradually to about 140°–145° C., and holding it there for approximately five minutes. Overheating at temperatures above 145° C. and for longer than about 5 minutes can cause sugar browning. It has also been found that heating at significantly lower temperatures but for long periods of time does not induce polymerization of the sugar molecules. Where oligo-saccharides are already present in the starting mixture, i.e. when malto-dextrin or dextrin is utilized, heating to a temperature of approximately 115–125° C. has been found sufficient to ensure the presence of the required sugar polymers and the molten state.

Following formation of the oligo-saccharide stereopolymers, water is added to the mixture to bring the total sugars content of the mixture to between 70% and about 80%. Preferably this is accomplished by cooling the mixture to approximately 90°–110° C. and adding the water. The addition of water to the sugars syrup at this higher temperature is preferred since it has been found that it tends to drive off any undesirable flavours from the sugars resulting from any minor caramelization, although the tendency for the sugars to caramelize has been reduced by avoiding prolonged heating at higher temperatures. It has also been found easier to adjust the sugars content of the molten sugar mixture at this temperature since the syrup becomes quite viscous upon cooling.

The sugars syrup containing the oligo-saccharides is brought to about room temperature (about 20° C.–30° C.) for the addition of the volatile food essences. The essences are first dissolved in a binding agent, preferably glycerin, of an amount sufficient to become about 1%–5% of the final product. The binding agent may also be propylene glycol, polyethylene glycol, or mixtures thereof, and with glycerin. The binding agent serves to minimize the loss of any low-boiling water-soluble flavour essences during drying, and acts as a solvent for both the sugars and the flavour compounds. The binding agent containing the flavour volatiles is then added to the cooled mixture containing the oligo-saccharide sugar polymers, and is stirred for sufficient time to achieve proper blending. It is necessary to mix the flavour essences with the glycerin or other binding agents at about room temperature or at as low a temperature as possible to minimize the loss of easily volatilized compounds. For example, temperatures in the neighbourhood of 50° C. will result in significant loss in the case of delicate fruit flavours.

It is preferable but not essential, in order to aid the drying and then crushing of the resultant mixture, to add a small amount of a foaming agent, preferably less than about 2% of the final product. The use of a foaming agent aids in the drying of the sugar mixture and helps maintain the desired amorphous state of the product, although converting the product to a foam before drying is not required. Suitable foaming agents which can be used in the practice of this invention are hydrophilic colloids (such as modified starch and methylcelluloses), sugar esters, monoglycerides, acetyl monoglycerides, or mixtures thereof. Alternatively, materials such as dextrin (D.E. 5–15), pectin, fine-milled fruit sauce, or finely-powdered (smaller than 40 mesh) fruit flakes (3–5% of final product) may be utilized to promote the desired amorphous state of the final product. It is also preferable but not essential that the foaming agent contain approximately 0.01% to 1% of an anti-oxidant to retard oxidation of any of the aroma compounds.

The sugar polymers base containing the flavour volatiles and binding agent is dried and ground to form a powdered product having a moisture content of less than about 5%, preferably between 2% and 4%. It is desirable that drying of the product takes place at or below room temperature to minimize loss of flavour and aroma with the water evaporation. If the product is being dried at reduced pressure, a lower temperature is preferred. If drying is undertaken at atmospheric pressure a temperature of up to 50° C. may be tolerated in some instances; under reduced pressure, for example 25 to 29 inches Hg, the temperature should not exceed 30° C. Drying methods such as vacuum belt drying, vacuum drum drying, dessicated air drying, or freeze-drying may be utilized.

It has been found advantageous, although not necessary, to add to the resulting dry, powdered mixture from about 0.1% to about 5% of an anti-caking agent to reduce any tendency of the powder to cake during storage. Suitable anti-caking agents which may be used for this purpose are micro-silicagel, calcium silicate, tricalcium phosphate, or one of the well-known cereal-base anti-caking agents.

The dry, powdered oligo-saccharide compound containing the entrapped flavour and aroma essences produced as above has been found to be non-hygroscopic and yet soluble in water, releasing the locked-in flavour volatiles to give the product pleasing aroma and flavour closely resembling that of the original foodstuff.

The dry powder containing the volatile flavour and aroma compounds will find practical application when blended into the dried flakes or powder of the original foodstuff, and in this way it is possible to prepare sweetened, low-moisture, dried food products with stable flavour and aroma essences added back thereto to replace that lost during processing of the foodstuff. The addition of the volatile flavour and aroma essences near or below room temperature and, in addition, the use of a binding agent such as glycerin minimizes their loss during the subsequent drying step, and assures maximum retention of the flavour essences within the complex stereo-structure of the oligo-saccharide base.

The practice of the present invention will now be more specifically described by reference to the following examples.

EXAMPLE 1

300 gms. (3 parts) of sucrose, 100 gms. (1 part) of corn syrup (43° Baumé, 20% water, total carbohydrates 80%) having a low dextrose equivalent (17.5%), and 15 ml. of water were mixed in a one litre stainless-steel vessel provided with a stirrer and thermometer. The contents of the vessel were brought to a gentle boil over a hot plate and water was boiled off until the temperature of the sucrose-corn syrup mixture reached a temperature of about 145° C. The mixture was held at 145° C. for 5 minutes while slowly stirring to permit the sugars to undergo a thermal polymerization. The mixture was then cooled to 100° C. and 15 ml. of water was added to adjust the sugar concentration of the mixture to about 70%. The mixture was then cooled to room temperature (20° C.), the stirrer speed was increased, and 4 ml. of 100 fold strength apple essence concentrate dissolved in 4 ml. of glycerin was added slowly over a period of about one-half a minute. Stirring was continued and 4 gms. of a foaming agent (methylcellulose 2 gms. and acetylated monoglyceride 2 gms.) were added. After additional stirring for about 2 minutes, the foamed syrup was transferred to a drying dish and dried under vacuum at room temperature. After dehydration the product was ground to a powder (moisture content 3%) in a mortar. In the solid dried state the product did not have detectable aroma, was not hygroscopic, but was readily water-soluble. When dissolved in water the resultant solution possessed a satisfactory apple aroma. When the product was blended with an equal weight of dry unsweetened applesauce flakes, and sufficient water to reconstitute the mixture to a sauce, a sweetened applesauce having a very satisfying aroma and flavour was produced.

One part of the sugar polymer containing 100 fold apple flavour concentrate and 3 parts of dried unsweetened apple sauce flakes were blended and stored at room temperature (20° C.) under a nitrogen pack for a period of 3 months. When reconstituted with sufficient water to form a sauce, the apple sauce had the aroma and flavour of fresh applesauce.

EXAMPLE 2

The above example was repeated using corn syrup having 35% dextrose equivalent (43° Baumé). Following addition of the glycerin and stirring for several minutes, 2 gms. of a foaming agent, carboxymethylcellulose, containing 0.01% butylated hydroxyanisole as an anti-oxidant was added. After dehydration, the product was ground to a powder, and 2% (by weight) of silica gel, 3 micron size, (as an anti-caking agent) was added. The product was easily handled, did not have any detectable odour in the dried powder state, but when dissolved in water, the resultant solution possessed a satisfactory apple aroma.

EXAMPLE 3

130 gms. (2 parts) of sucrose, 65 gm. (1 part) corn syrup (43° Baumé, approximately 55% dextrose equivalent), 20 gms. of malto-dextrin (15% dextrose equivalent), and 10 ml. of water were placed in a 500 ml. stainless-steel vessel provided with a stirrer and thermometer. The water was boiled off until a temperature of 120° C. was reached and the sugar mixture was held at 120° C.–125° C. for 5 minutes while stirring slowly to permit formation of the oligo-saccharides. The mixture was then cooled to 100° C. and 10 ml. of water was added to the thickened sugar syrup to adjust the solids content to approximately 70%. The mixture was cooled to room temperature (20° C.), stirrer speed was increased and 4 mls. of 50 fold strength raspberry essence concentrate dissolved in 4 mls. of glycerin were stirred slowly into the syrup. Stirring was continued for several minutes, then 2 gms. of sucrose monopalmitate (a foaming agent) containing 0.01% butylated hydroxytoluene (anti-oxidant) was added. The syrup was dried following the same procedure as in Example 1. The final dried product did not give off any detectable aroma, but mixed readily with water to give a mixture having a satisfactory raspberry aroma.

EXAMPLE 4

300 gms. (3 parts) of sucrose, 100 gms. (1 part) of decoloured hydrol (40° Baumé) and 10 mls. of water were heated together in a 1 litre stainless-steel vessel equipped with stirrer and thermometer. The water was slowly boiled off until the temperature reached 145° C., and the mixture was held at that temperature for 5 minutes while stirring slowly to cause formation of the polymeric oligo-saccharides. The mixture was cooled to approximately 100° C. and approximately 15 mls. of water was added to the thickened sugars in order to adjust the sugar concentration to approximately 75%. The mixture was then cooled to room temperature (20° C.) and 4 ml. of 100 fold strength grape essence concentrate dissolved in 4 gms. of glycerin plus polyethyleneglycol, molecular weight approximately 1000 (1:1 w./w.) was slowly added to the syrup with stirring. A foaming agent containing an anti-oxidant was added to the syrup as in Example 1, and the syrup was dried following the same procedure as given in Example 1 above. The final dried product did not have any detectable odour, was non-hygroscopic, and mixed readily with water to give a mixture having a satisfacory grape aroma.

The products produced in Examples 1 to 4 above were colourless amorphous powders which dissolved readily in water and in alcoholic beverages. The powders were non-hygroscopic, slightly sweet to the taste, and had no detectable aroma when dry. A satisfactory aroma and flavour resulted when the powder was wetted or dissolved in a solution. It was found that even after six months of storage at room temperature (20° C.) the powder retained sufficient aroma in the stereostructure of the oligo-saccharides providing the powder was not exposed to a high humidity atmosphere.

It will be apparent that, although the previous examples have shown apple, raspberry, and grape fruit flavours, it is also possible and within the scope of this invention to lock-in other tastes and aromas such as those derived from coffee, tea, vegetables, or other fruits such as cherry, pineapple and peach. The invention finds particular application in the preservation of water-soluble flavours and aromas, but also may be utilized for protection of water-insoluble essences such as orange and lemon oils.

I claim:

1. A method for the preservation of volatile flavours and aromas in stable dry form which includes the steps of:
    (a) heating a sugars-containing mixture comprising from about 50% to about 80% by weight sucrose, to a temperature and for a limited period of time sufficient to cause formation of oligo-saccharides in such an amount as to ensure a resultant sugar polymers base but insufficient to result in browning or caramelization;
    (b) adding sufficient water to the resultant sugar polymers base to adjust the total sugars content to about 70% to about 80%, by weight;
    (c) cooling the sugar polymers base to a temperature not exceeding 50° C.;
    (d) dissolving desired flavour and aroma essences in a liquid binding agent which is also a solvent for said sugar polymers base and blending the solution with the sugar polymers base to result in absorption of said binder and essence solution into said sugar polymers base to cause entrapment of the flavour and aroma essence in the stereostructure of the oligo-saccharides in the sugar polymers base; and (e) drying the product at a temperature not exceeding about 50° C. to a moisture content of less than about 5%, by weight.

2. A method as defined in claim 1 in which the preserved flavour and aroma essences are water-soluble.

3. A method as defined in claim 1 in which:
(f) the final product subsequently is ground to form a powdered, amorphous solid.

4. A method as defined in claim 3 in which:
(a) said sugars containing mixture is heated to a temperature of at least about 115° C. but not exceeding about 145° C. for a period of time not exceeding about 5 minutes at 145° C.

5. A method as defined in claim 4 in which:
(b) the water is added to the resultant sugar polymers base when the base is at a temperature between about 90° C. and about 110° C., and,
(c) the sugar polymers base is cooled to a temperature not exceeding about 30° C. prior to blending the flavour and aroma essences and binder therewith.

6. A method as defined in claim 4 in which:
(e) the sugar polymers base blended with the flavour essences and binding agent is dried at a temperature not exceeding about 30° C. to a moisture content of between about 2% and 4%, by weight.

7. A method as defined in claim 3 wherein said sugars-containing mixture contains at least one substance selected from the group consisting of sucrose, dextrose, maltose, dextrin, malto-dextrin, corn syrup, hydrol, hydrogenated hydrol, and mixtures thereof, and in which sucrose comprises from about 50% to about 75% by weight, of the mixture.

8. A method as defined in claim 3 wherein:
(d) said binding agent is selected from the group comprising glycerin, propylene glycol, polyethylene glycol, and mixtures thereof.

9. A method as defined in claim 3 wherein:
(d) a foaming agent comprising less than about 2% by weight, of the final product is added to the sugar polymers base prior to the drying step.

10. A method as defined in claim 1, in which:
(a) said sugars containing mixture is heated to a temperature of at least about 115° C. but not exceeding about 145° C. for a period of time not exceeding about 5 minutes at 145° C.

11. A method as defined in claim 10 wherein said sugars-containing mixture contains at least one substance selected from the group consisting of sucrose, dextrose, maltose, dextrin, malto-dextrin, corn syrup, hydrol, hydrogenated hydrol, and mixtures thereof, and in which sucrose comprises from about 50% to about 75% by weight, of the mixture.

12. A method as defined in claim 10 wherein:
(d) said binding agent is selected from the group comprising glycerin, propylene glycol, polyethylene glycol, and mixtures thereof.

13. A method as defined in claim 10 wherein:
(d) a foaming agent comprising less than about 2% by weight, of the final product is added to the sugar polymers base prior to the drying step.

14. A method as defined in claim 1 wherein said sugars containing mixture contains at least one substance selected from the group consisting of sucrose, dextrose, maltose, dextrin, malto-dextrin, corn syrup, hydrol, hydrogenated hydrol, and mixtures thereof, and in which sucrose comprises from about 50% to about 75%, by weight, of the mixture.

15. A method as defined in claim 14 in which:
(b) the water is added to the resultant sugar polymers base when the base is at a temperature between about 90° C. and about 110° C., and,
(c) the sugar polymers base is cooled to a temperature not exceeding about 30° C. prior to blending the flavour and aroma essences and binder therewith.

16. A method as defined in claim 15 in which:
(e) the sugar polymers base blended with the flavour essences and binding agent is dried at a temperature not exceeding about 30° C. to a moisture content of between about 2% and 4%, by weight.

17. A method as defined in claim 15 wherein:
(e) the sugar polymers base blended with the flavour essences and binding agent is dried at a temperature not above about 20° C. and at a reduced pressure of less than one atmosphere.

18. A method as defined in claim 14 wherein:
(d) said binding agent is selected from the group comprising glycerin, propylene glycol, polyethylene glycol, and mixtures thereof.

19. A method as defined in claim 18 in which:
(e) the sugar polymers base blended with the flavour essences and binding agent is dried at a temperature not exceeding about 30° C. to a moisture content of between about 2% and 4%, by weight.

20. A method as defined in claim 18 wherein:
(e) the sugar polymers base blended with the flavour essences and binding agent is dried at a temperature not above about 20° C. and at a reduced pressure of less than one atmosphere.

21. A method as defined in claim 14 wherein:
(d) a foaming agent comprising less than about 2% by weight, of the final product is added to the sugar polymers base prior to the drying step.

22. A method as defined in claim 1 in which:
(b) the water is added to the resultant sugar polymers base when the base is at a temperature between about 90° C. and about 110° C., and,
(c) the sugar polymers base is cooled to a temperature not exceeding about 30° C. prior to blending the flavour and aroma essences and binder therewith.

23. A method as defined in claim 22 wherein:
(d) said binding agent is selected from the group comprising glycerin, propylene glycol, polyethylene glycol, and mixtures thereof.

24. A method as defined in claim 22 wherein:
(d) a foaming agent comprising less than about 2% by weight, of the final product is added to the sugar polymers base prior to the drying step.

25. A method as defined in claim 24 wherein:
(e) the sugar polymers base blended with the flavour essences and binding agent is dried at a temperature not above about 20° C. and at a reduced pressure of less than one atmosphere.

26. A method as defined in claim 1 wherein:
(d) said binding agent is selected from the group comprising glycerin, propylene glycol, polyethylene glycol, and mixtures thereof.

27. A method as defined in claim 26 wherein:
(d) a foaming agent comprising less than about 2% by weight, of the final product is added to the sugar polymers base prior to the drying step.

28. A method as defined in claim 1 wherein:
(d) a foaming agent comprising less than about 2% by weight, of the final product is added to the sugar polymers base prior to the drying step.

29. A method as defined in claim 28 in which said foaming agent contains from about 0.01% to about 1%, by weight, of an anti-oxidant.

30. A method as defined in claim 1 in where:
(e) the sugar polymers base blended with the flavour essences and binding agent is dried at a temperature not exceeding about 30° C. to a moisture content of between about 2% and 4%, by weight.

31. A method as defined in claim 1 wherein:
(e) the sugar polymers base blended with the flavour essences and binding agent is dried at a temperature not above about 20° C. and at a reduced pressure of less than one atmosphere.

32. A stable, dry food essence product consisting essentially of:
(a) a major proportion of a sugar polymers base containing predominantly oligo-saccharides;
(b) a minor proportion of a binding agent which is a solvent for said base and is absorbed therein; and
(c) normally volatile flavour and aroma essence dissolved in said binding agent and entrapped in the stereostructure of said oligo-saccharides.

33. A food product as defined in claim 32 including from about 1% to about 5%, by weight, of said binding agent.

34. A food product as defined in claim 33 in which said binding agent is selected from the group comprising glycerin, propylene glycol, polyethylene glycol, and mixtures thereof.

35. A food product as defined in claim 32 having a moisture content not exceeding about 5% by weight.

36. A stable, dry food essence product as claimed in claim 32 having a foaming agent embodied therein.

37. A stable, dry food essence product as claimed in claim 32 having an anti-caking agent embodied therein.

38. A stable, dry food essence product as claimed in claim 32 wherein said essence is a water-soluble fruit aroma and flavour essence.

References Cited

UNITED STATES PATENTS

| | | | |
|---|---|---|---|
| 2,899,313 | 8/1959 | Makower et al. | 99—140 |
| 2,854,343 | 9/1958 | Strashun et al. | 99—140 X |
| 2,827,452 | 3/1958 | Schlenk et al. | 99—140 UX |
| 2,906,630 | 9/1959 | Turkot et al. | 99—206 |

FOREIGN PATENTS

| | | | |
|---|---|---|---|
| 1,018,343 | 1/1966 | Great Britain | 99—140 |

JOSEPH SCOVRONEK, Primary Examiner

W. BOVEE, Assistant Examiner

U.S. Cl. X.R.

99—28, 30, 101